United States Patent
Depraetere et al.

(10) Patent No.: US 10,936,656 B2
(45) Date of Patent: Mar. 2, 2021

(54) ON-DEMAND SEMANTIC DATA WAREHOUSE

(71) Applicant: Agfa Healthcare NV, Mortsel (BE)

(72) Inventors: Kristof Depraetere, Mortsel (BE); Giovanni Mels, Mortsel (BE); Dirk Colaert, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 515 days.

(21) Appl. No.: 14/421,159

(22) PCT Filed: Sep. 3, 2013

(86) PCT No.: PCT/EP2013/068156
§ 371 (c)(1),
(2) Date: Feb. 12, 2015

(87) PCT Pub. No.: WO2014/033316
PCT Pub. Date: Mar. 6, 2014

(65) Prior Publication Data
US 2015/0205886 A1    Jul. 23, 2015

Related U.S. Application Data

(60) Provisional application No. 61/696,309, filed on Sep. 4, 2012.

(30) Foreign Application Priority Data

Sep. 3, 2012    (EP) .................................... 12182778

(51) Int. Cl.
G06F 16/25        (2019.01)
G06F 16/901       (2019.01)
G06F 16/955       (2019.01)

(52) U.S. Cl.
CPC ........ *G06F 16/9024* (2019.01); *G06F 16/254* (2019.01); *G06F 16/258* (2019.01); *G06F 16/9566* (2019.01)

(58) Field of Classification Search
CPC ............ G06F 16/9024; G06F 16/9566; G06F 16/258; G06F 16/254
(Continued)

(56) References Cited

U.S. PATENT DOCUMENTS

2003/0217069 A1* 11/2003 Fagin ................ G06F 17/30569
2007/0294269 A1    12/2007 Ma et al.
(Continued)

OTHER PUBLICATIONS

Official Communication issued in International Patent Application No. PCT/EP2013/068156, dated Dec. 2, 2013.
(Continued)

*Primary Examiner* — Usmaan Saeed
*Assistant Examiner* — Jessica N Le
(74) *Attorney, Agent, or Firm* — Stinson LLP

(57) ABSTRACT

A system for creating a semantic data warehouse including a convergence service configured to execute queries to connected data sources, to convert data from source to domain semantics, and to aggregate converted data. The convergence service is configured to invoke by an entity graph service that, on demand, defines a semantic entity representation, the needed queries and data sources to be queried; and projects and makes available the resulting data in the semantic entity representation.

8 Claims, 3 Drawing Sheets

(58) Field of Classification Search
USPC .......................................................... 707/756
See application file for complete search history.

(56) References Cited

U.S. PATENT DOCUMENTS

| | | |
|---|---|---|
| 2008/0059442 A1 | 3/2008 | Guo et al. |
| 2010/0198778 A1* | 8/2010 | Venugopal .......... G06F 17/3089 707/602 |
| 2011/0087629 A1* | 4/2011 | B'Far ..................... G06N 5/022 706/46 |
| 2012/0095957 A1* | 4/2012 | Reddy ................... G06F 16/256 707/602 |
| 2012/0124080 A1* | 5/2012 | Willard ............... G06F 16/2438 707/769 |

OTHER PUBLICATIONS

Reisser et al., "Utilizing Semantic Web Technologies for Efficient Data Lineage and Impact Analyses in Data Warehouse Environments," 20th International Workshop of Database and Expert Systems Application, Aug. 2009, pp. 59-63.

* cited by examiner

ON-DEMAND SEMANTIC DATA WAREHOUSE

CROSS-REFERENCE TO RELATED APPLICATIONS

This application is a 371 National Stage Application of PCT/EP2013/068156, filed Sep. 3, 2013. This application claims the benefit of U.S. Provisional Application No. 61/696,309, filed Sep. 4, 2012, which is incorporated by reference herein in its entirety. In addition, this application claims the benefit of European Application No. 12182778.6, filed Sep. 3, 2012, which is also incorporated by reference herein in its entirety.

BACKGROUND OF THE INVENTION

1. Field of the Invention

The present invention relates to data warehousing, more specifically data warehousing in a clinical or hospital environment.

2. Description of the Related Art

In recent years there has been a transition from hospital information systems for administrative purposes towards more dedicated clinical information systems to support clinical workflow and decision making.

Clinical data are not only stored in hospitals, but also at general practices, private specialists' practices and other healthcare environments, for example homes for the elderly. Many new data sources will have to be created to improve data quality or to provide specific information.

As the patients and their clinical data are central to the healthcare system and economics become more important it is imperative to connect different data sources, not only on individual patient level but also on population level to perform e.g. epidemiological studies to support policy making.

Data storage in one information system differs a lot from another system's storage model. The databases have very variable schemas, i.e. the meaning or semantics of their data differs a lot.

For example in Agfa HealthCare's clinical information management system named ORBIS, there is besides a denomination 'natural person' also a denomination 'patient'. Another clinical information system does not necessarily make this distinction. To effectively connect these systems they have to be made interoperable by integrating their data through unification of their semantics on a scale as large as possible.

To unify heterogeneous data semantics on a computer they have to be explicit and formal.

This is achieved by expressing data in a global formal language of which the semantics are clear, i.e. specified by a model theory (being based on first order logic and set theory (mathematics)) limiting the interpretation of the semantics and eliminating ambiguity.

The World Wide Web Consortium (W3C) paved the way to realize this by initiating the Semantic Web in 2001.

The Semantic Web technology comprises global formal languages to express formal data and other resources such as ontologies to capture clinical and non-clinical domain knowledge, and rules which are used by a reasoner to convert semantics and analyze/synthesize formal data.

Methods have been developed to formalize and formally analyze clinical data.

As a support for decision making data warehouses have been developed. A data warehouse is a repository of data extracted from various other databases. A data warehouse reorganizes the extracted data and makes the reorganized data available for business intelligence applications.

Data warehousing is applied in an open environment implying that an application such as a business intelligence application requesting data needs to identify data source to be queried.

Considering the fact that a request may need data from a variety of data sources, there is a need for optimized identification of these data sources.

SUMMARY OF THE INVENTION

Preferred embodiments of the present invention provide a system for creating a data warehouse comprising a convergence service for executing queries to connected data sources, converting data from source to domain semantics and aggregating converted data characterized in that
  said convergence service is invoked by an entity graph service that on demand defines a semantic entity representation, the needed queries and data sources to be queried and projects and makes available the resulting data in said entity representation.

In the context of the present invention a convergence service is a software system designed to support interoperable interaction over the world wide web.

The convergence service is invoked by an entity graph service.

The convergence service performs a conversion of data expressed with data definition ontologies (DDO) as available in the data sources to data expressed with the domain ontologies (DO) as used by the entity graphs and aggregates the resulting data.

The conversion service uses formal declarative rules for the conversion process.

In order to be able to provide a user with a unified view of data from different data sources with each having different local semantics, an entity graph service is used that on demand produces an entity graph by specifying which data needs to be retrieved from identified data sources, invoking the convergence service to retrieve the data from the different data sources and convert the data from the local semantics to the domain ontology, and projecting the result to the model of the defined entity representation.

An entity representation is stated in RDF (Resource Description Framework).

The said entity representation is in the preferred embodiments of this invention provided by a named entity graph denoted by an URL.

Entity graphs are constructed on demand based on the use case. These entity graphs are specific configurable entity representations with unification of data from different data sources.

An entity graph comprises a subject (the entity) and for this subject all related relationships with other subjects that are deemed relevant by a certain configuration.

Discovery graphs, which are also entity graphs, may be used to find the URL of a named entity graph. A discovery graph describes characteristics of the named entity graphs. A query on these characteristics allows the user to find the corresponding URL of the named entity graph.

An entity graph can be used as a data graph in the entity graph SPARQL endpoint to provide answers to queries on the named entity graph.

The entity graph SPARQL endpoint may provide caching functionality to cache the generation of the entity representation.

The formal representation of an entity graph can be retrieved by resolving the URL of the named entity graph.

A specific ETL (Extract-Transform-Load) process can be defined for each of the targeted data consumer data schemas and the configured entity graphs.

The data warehouse exposes on demand domain entity graphs.

The data warehouse can be scaled at development time by allowing development of additional independent plug-ins to expose new entity graphs. Plug-ins for existing entity graphs do not need to be adapted.

The main differences between the data warehouse of preferred embodiments of the present invention and prior art data warehouses is that the data warehouse of the preferred embodiments of the present invention uses formal semantic web technology mechanisms to convert between domains, more specifically between the domain of the data source and the domain of the data warehouse. The conversion process is stated using formal declarative rules.

Furthermore it is an on demand service that retrieves the needed data from the data sources on a just in time basis. This is in contrast with the prior art where a data warehouse is populated via an extract-transform-load procedure that is planned to run on a predefined schedule.

Furthermore it allows for incremental extension by the mentioned plug-ins.

The preferred embodiments of the invention are advantageous in that at run time only data are fetched that is needed and when it is needed.

In order to be able to process huge entity graphs within reasonable memory constraints, entity graphs may be partitioned so as to fit into the memory of a hosting machine, i.e. to scale up onto a single system.

In order to be able to process huge entity graphs within reasonable computation time constraints, entity graphs may be partitioned so as to perform parallel processing, i.e. to scale out across multiple systems.

A virtual entity graph can then be defined which on demand recombines the partitioned entity graphs into a single entity graph.

In one preferred embodiment the results of each partitioned entity graph is streamed sequentially to recombine into a single entity graph.

Further advantages and preferred embodiments of the present invention will become apparent from the following description and drawings.

The present invention can be implemented as a computer program product adapted to carry out the steps set out in the description.

The computer executable program code adapted to carry out the steps set out in the description can be stored on a computer readable medium.

DETAILED DESCRIPTION OF THE PREFERRED EMBODIMENTS

Figure 1:
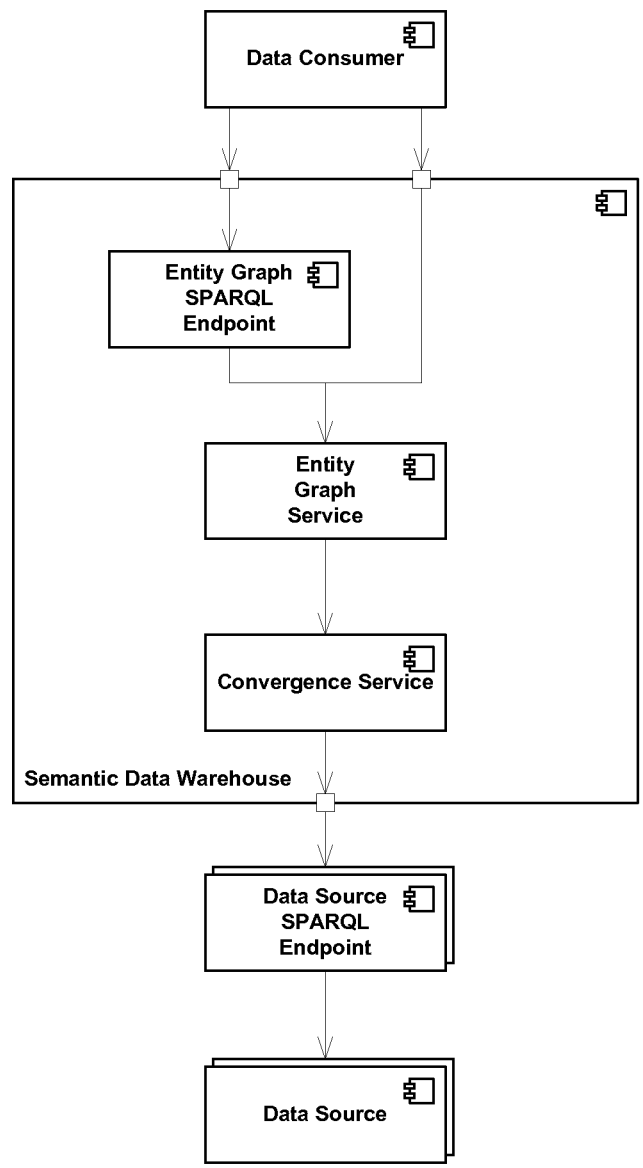
FIG. 1 shows a conceptual view of a data warehouse according to the present invention.

A data warehouse according to a preferred embodiment of the present invention is shown in FIG. 1 and mainly consists of a convergence service and an entity graph service, the latter being arranged to be able to invoke the convergence service. The convergence service is connected to a number of databases through SPARQL endpoints enabling to query knowledge databases via the SPARQL language.

The data warehouse can be queried by data consumers like business intelligence tools or i2b2 applications or other querying applications.

Alternatively the data warehouse allows the full entity representation to be retrieved without specifying a query.

The convergence service is responsible for:
The configuration of multiple domains, i.e. the needed DDO to DO mapping files for each of the data sources, the data source locations and their respective needed access credentials.
Invoking the referenced DDO queries on the SPARQL endpoint of the corresponding data source.
Loading the needed DDO to DO conversion rules for the specified domain.
Converting the DDO data to DO for each source using the loaded DDO to DO conversion rules.
Aggregate the converted results from the specified data sources.
Returning the aggregated and converted data set.

In a specific preferred embodiment the convergence service is implemented as a SPARQL endpoint exposed as a web service.

The convergence service uses conversion rules to perform the DDO to DO mapping.

Conversion services are known in the art. However in order to be able to operate in an open environment a caller would need to specify the required sources to solve a query which could lead to a breach of abstraction. To solve this problem the concept of entity graphs and entity graph service is introduced in a preferred embodiment of the present invention.

An entity is the DO concept that is the main subject of the graph, i.e. it is the centre of the graph and this subject is connected to other objects. The entity graph comprises subject, properties and objects. It is the responsibility of the designer of the entity graph to decide which subject, properties and objects that are deemed relevant to be mentioned in the graph.

In a preferred embodiment of the present invention, an entity graph is a named entity graph, i.e. the entity is assigned an URI. When resolving the URI, because it is in fact an HTTP URL, a consumer can retrieve the full entity graph.

The named graphs are constructed on-demand when their URIs are resolved by invoking the convergence service to query and transform the data.

The entity representations are stated as RDF and for example serialized using the N-Triples, Turtle, Notation3 (N3) or RDF/XML formats.

In one preferred embodiment a consumer using the entity graph SPARQL endpoint can issue SPARQL queries on an entity graph as a data graph to query for specific data.

For example an entity graph can be created for an entity being a PATIENT. The entity graph may contain the patient's surname, first name, examination, etc. and the data sources required to obtain the necessary data. The entity graph also has a template of the way the entity PATIENT is to be described in RDF.

In one preferred embodiment of this invention, first the domain graph is created expressed using ontologies, which form the domain ontology.

This domain graph restricts the possible domain queries, specifies the entity representation and gives scope to mapping rules.

Once the domain graph is defined, data sources can be identified and integrated that will provide (part of) the data for the domain graph. This integration is done by having a data manager write mapping rules from the data expressed in DDO to the data expressed in DO.

Figure 2:
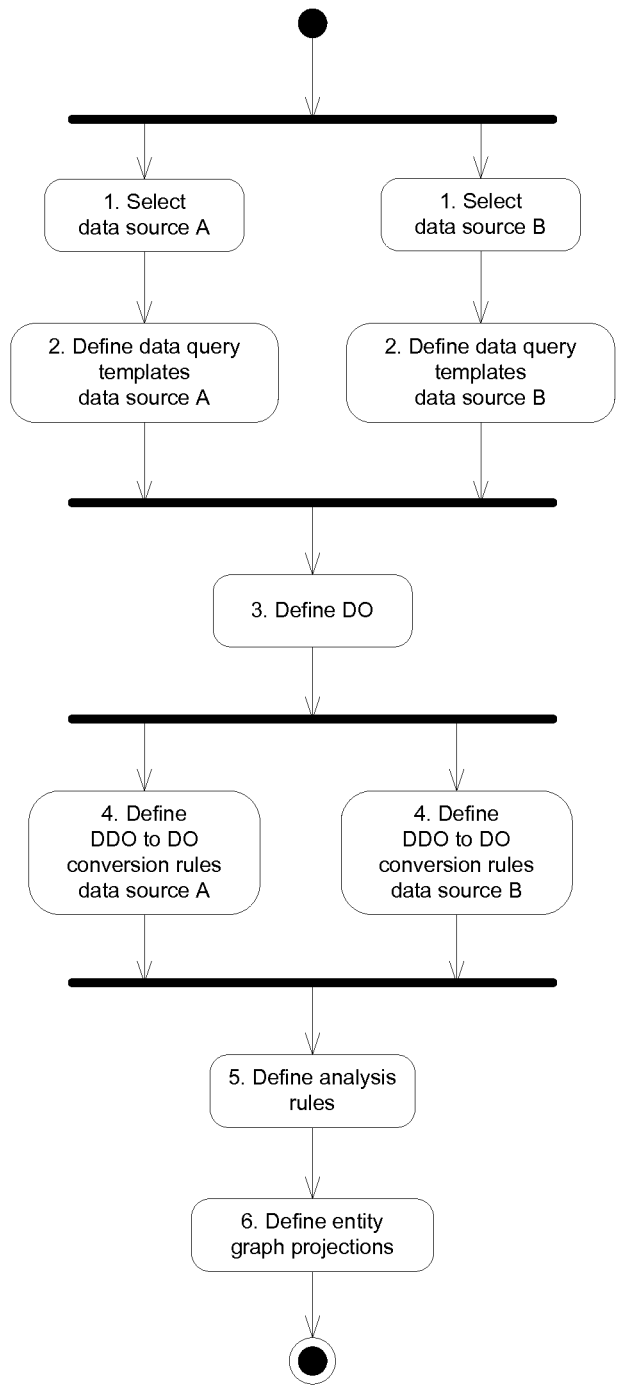
FIG. 2 illustrates the development-time aspects of the semantic data warehouse.
Figure 3:
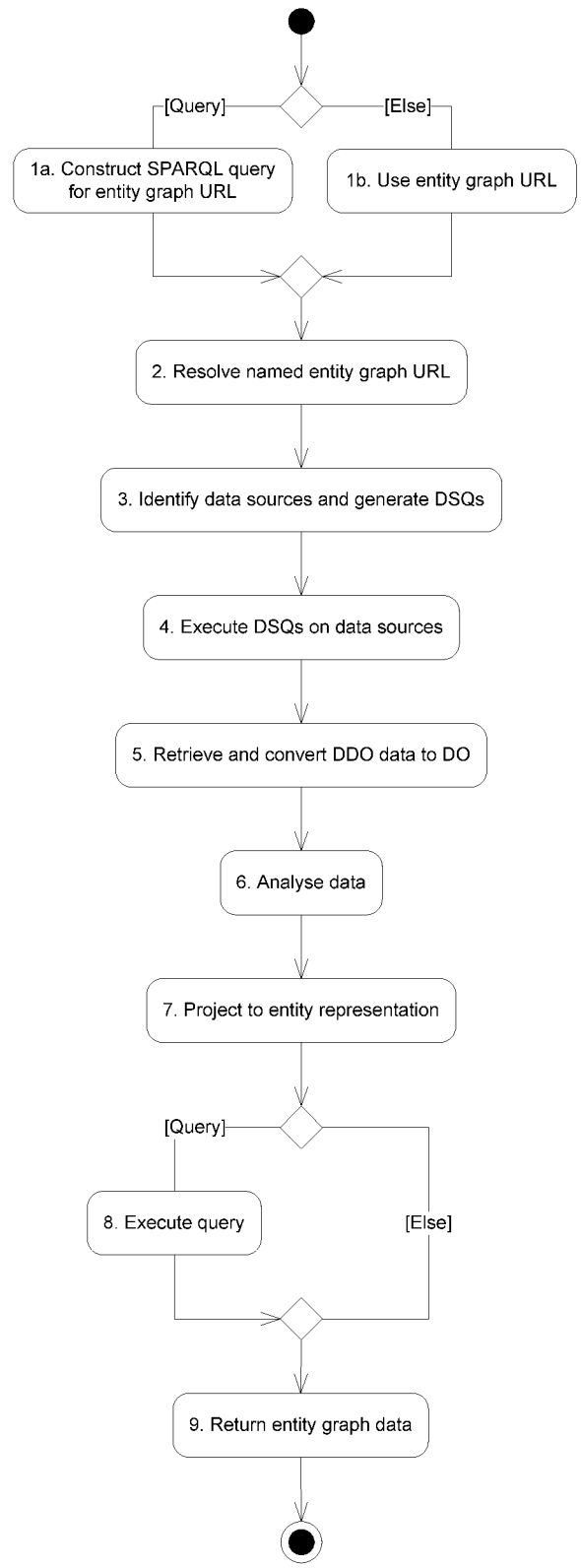
FIG. 3 illustrates the run-time aspect of the semantic data warehouse.

The process of clinical data formalization and analysis in the semantic data warehouse both at development time and at runtime is illustrated in FIG. 2 and FIG. 3 respectively.

Development Time:

At development time a 'formal library' is created containing all the needed resources to enable the process.

In step 1 applicable data sources are selected in this example from 2 different clinical information systems from 2 hospitals, both with different databases. Both contain data about identical patients, but stored differently, so the data cannot be semantically shared between them in an automated way on an 'operational' non-formal level using SQL. For this reason the semantics of the data have to be converted to formalisms that enable data integration.

In order to enable semantic integration of their data both data sources should preferably provide a data source SPARQL endpoint that enables the data to be queried using queries expressed using a data source specific Data Definition Ontology (DDO). DDOs are declared in RDF/S and OWL. This provides the actual data formalization in "local" formal semantics.

In step 2 for each SPARQL endpoint a series of Data SPARQL Queries (DSQ) templates are stated with the formal elements of the corresponding DDO and the needed filter conditions to be applied specified by placeholders. These queries will retrieve data for populating the entity graphs. DDOs and DSQs exist in a "local formal world".

In step 3 Domain Ontologies (DO) are created or reused. They contain "global" formal semantics of any kind of domain knowledge (clinical and non-clinical) decoupled from the local formal semantics of the DDOs. DOs are also declared in RDF/S and OWL.

Step 4 comprises the creation of conversion rules written in N3 for each of the data sources. The premise of such a rule contains mainly local semantics expressed in DDO formalisms. The conclusion contains global semantics expressed in DO formalisms. These rules provide a very powerful and flexible means for further formalizing i.e. "globalizing" data by converting local formal semantics to global formal semantics.

For this globalization other resources than specific conversion rules can be used: instance mapping files, general conversion rules, and builtins.

Instance mapping files are created or reused. E.g. in a database numerical codes or text or a mix of both are representing clinical data. These are in DDO formalisms 'plain literals'. They need extra restriction to make their semantics explicit, therefore as formal instances they are assigned a datatype. This way they can be mapped to DO classes in such a mapping. E.g. in a database of a clinical information system the clinical terms for bacteria and drugs are represented by UniProt taxonomy codes and ATC codes respectively. The formal datatyped instances of these codes are linked to corresponding DO classes.

Builtins are expressed in a hybrid procedural-declarative language prolog or purely declarative language and are used by the reasoner to perform all kinds of inferring and calculations, e.g. extract a time zone from a time expression or convert one time expression to another. The formal elements to express them are also stated in ontologies. An example is the 'math' ontology from which e.g. the property math:sum invokes a builtin to add 2 numbers.

Advantages of two-step formalization, i.e. actual formalization and globalization, are scalability and greater expressivity, compared to one-step formalization. The conversion rules together with the data source mapping and the instance mapping assure scalability due to the decoupling of semantics mentioned above. If a data source changes—e.g. replacement of a coding system—only the DDO, data source mapping and the instance mapping have to be adapted to operational semantics, not the DOs to which also all other DDOs are converted to. The decoupling also permits a DO to be more expressive than an ontology in a one-step approach because the semantic gap is allowed to be bigger. To make the DDO semantics fully explicit this higher expressivity is needed, meaning more classes and properties to express the extra knowledge that is still implicit in the DDO. This leads to a better unification of the semantics of the different data sources and to a more stable expression of domain knowledge in DOs. The expressivity is used by the EYE reasoner outputting the conclusions of N3 rules.

In step 5 N3 rules are created or reused to analyze/synthesize formal data i.e. to infer new facts from existing ones through all kinds of calculations stated in the premise of a rule. E.g. calculate a body mass index or check patient lab results against lab measurement value ranges, taking into account age, gender and possible unit conversions.

In step 6 N3 queries are defined to project (structure) the entity graph representation using the DOs.

Additional data sources can be added to the semantic data warehouse by developing new plug-ins by applying development steps 2 and 4. Next the resulting plug-ins should be deployed in the data warehouse. The semantic data warehouse software itself does not need to be changed.

Runtime:

In step 1 the data consumer chooses to either issue SPARQL queries on the entity graph (step 1a) or to retrieve the complete entity graph (step 1b).

In step 1a the data consumer states the URL of the named entity graph as the data graph of a SPARQL query and sends it to the entity graph SPARQL service for execution.

In step 1b the data consumer states the URL of the named entity graph.

In step 2 either the entity graph SPARQL service or the data consumer resolves the URL of the named entity graph to retrieve the entity graph representation depending on the choice made in step 1.

In step 3 the entity graph service registered for the named entity graph URL generates the DSQ based on the templates and fills in the needed placeholders for each of the identified data sources and invokes the convergence service.

In step 4 the convergence service invokes each of the data source SPARQL endpoints with the corresponding DSQ.

In step 5 the convergence service retrieves these DDO expressed data sets and converts them to integrated "global" formal data in DO semantics using the conversion N3 rules together with instance mapping files, general conversion rules and builtins.

DOs can also be asserted by the reasoner, instead of merely referred to. This is done to pick up subclasses—e.g. of a certain drug—and instances of classes—e.g. in an enumeration of instances of a class—and matching of codes with classes, e.g. for lab tests.

In step 6 converted data are analyzed and synthesized with the analysis N3 rules registered in the entity graph service.

In step 7 the N3 projection queries are executed to generated the entity graph representation by the entity graph service.

In step 8 (optional) the entity graph representation is queried using the entity graph SPARQL service.

In step 9 the result sets either from step 7 or from step 8 are returned to the data consumer.

The invention claimed is:

1. A system for creating a virtual semantic data warehouse including data originating from a plurality of data sources which are not semantically organized, the system comprising:
a computer; and
a computer readable medium storing computer executable program code that, when executed by the computer, configure the computer for performing:
an entity graph service that, on demand in response to each user request, defines a semantic entity graph, defines data sources that are required to be queried to solve a user request for data, and defines queries necessary for each of the data sources to gather data from the data sources, the data sources including non-semantically organized data sources; and
a convergence service that, on demand in response to each user request, is configured to execute queries to the defined non-semantically organized data sources to retrieve data, to convert the retrieved non-semantically organized data from non-semantical form to semantical form through application of formally defined rules, and to aggregate the converted data; wherein
on demand in response to each user request, the convergence service is invoked by the entity graph service to transform the retrieved data, and to make the transformed data available to the user.

2. The system according to claim 1, wherein the entity graph service defines the semantic entity graph by a projection for an entity representation; and
the entity representation is provided by a named entity graph.

3. The system according to claim 2, wherein the named entity graph is denoted by an URL.

4. The system according to claim 3, wherein discovery graphs are used to find the URL of the named entity graph.

5. The system according to claim 3, wherein the URL of the named entity graph is resolved to retrieve the entity graph.

6. The system according to claim 3, wherein the URL of the named entity graph is used as a data graph in an entity graph SPARQL service.

7. The system according to claim 2, further comprising a plurality of the named entity graphs, and the named entity graphs are partitioned.

8. The system according to claim 7, wherein the named entity graph is configured to, on demand, recombine the partitions of the plurality of named entity graphs.

* * * * *